United States Patent [19]

Poirier et al.

[11] Patent Number: 4,704,815
[45] Date of Patent: Nov. 10, 1987

[54] BAITING APPARATUS

[75] Inventors: Clovis Poirier; Marcel Banville; Mario McDonald; Sabin McDonald; Stephen Johnston; Jean-Rene Masson, all of Sept-Iles, Canada

[73] Assignee: Ateliers Wood Inc., Canada

[21] Appl. No.: 6,053

[22] Filed: Jan. 22, 1987

[30] Foreign Application Priority Data

Jan. 23, 1986 [CA] Canada ................................. 500185

[51] Int. Cl.⁴ .............................................. A01K 97/00
[52] U.S. Cl. ........................................................ 43/4
[58] Field of Search ............................. 43/4, 4.5, 27.4

[56] References Cited

U.S. PATENT DOCUMENTS

| | | | |
|---|---|---|---|
| 2,511,828 | 6/1950 | Andrist | 43/4 |
| 2,518,590 | 8/1950 | Andrist | 43/4 |
| 2,670,556 | 3/1954 | Hopkins et al. | 43/4 |
| 3,997,996 | 12/1976 | Nygaard | 43/4 |
| 4,354,323 | 10/1982 | Huff | 43/4 |
| 4,437,254 | 3/1984 | Fancey et al. | 43/4 |
| 4,567,684 | 2/1986 | Bjorshol | 43/4 |
| 4,638,583 | 1/1987 | Bjorshol | 43/4 |
| 4,648,193 | 3/1987 | Alex et al. | 43/4 |

FOREIGN PATENT DOCUMENTS

| | | |
|---|---|---|
| 1025212 | 1/1978 | Canada . |
| 1086941 | 10/1980 | Canada . |
| 1119797 | 3/1982 | Canada . |
| 1135057 | 11/1982 | Canada . |
| 1165101 | 4/1984 | Canada . |
| 1175228 | 10/1984 | Canada . |
| 116942 | 6/1969 | Norway ................................. 43/4 |
| 656372 | 8/1951 | United Kingdom . |

Primary Examiner—M. Jordan
Attorney, Agent, or Firm—Browdy & Neimark

[57] ABSTRACT

A baiting apparatus having a chute for feeding bait stock, a reciprocally moveable knife blade below the chute for slicing pieces of bait from the stock, a cam plate secured to operate with the knife blade, a cam follower in operative association with the cam plate, a lever mechanism operable by the cam follower, and a retainer secured to the lever mechanism for retaining and gripping the sliced piece of bait.

23 Claims, 6 Drawing Figures

BAITING APPARATUS

This invention relates to an apparatus for placing bait upon fishing hooks.

Although commercial fishing has for years utilized nets for catching large quantities of fish, this method of fishing is not totally satisfactory. Nets are often damaged and lost and sink with the fish entwined in them. In such circumstances, the fish rot and the nets and rotten fish rise to the surface and the nets refill again with live fish. The cycle is then repeated. As fish are generally becoming scarcer in the oceans, the existence of many lost nets therefore leads to a greater depreciation of the stock, and this is occurring at the present time to such a degree that consideration is even being given to outlawing the use of nets because of the ravaging of the fish population.

Fishing with baited hooks, which improves the quality of the fish being caught as well as avoiding the net problem discussed above is a good alternative and is known however baiting machines presently used are large and do not provide consistent results. Patents which have been granted on baiting machines are as follows:

| Country | Patent Number | Issue Date | Inventor |
| --- | --- | --- | --- |
| Canadian | 1,025,212 | January 31, 1978 | William Nygaard |
| Canadian | 1,135,057 | November 9, 1982 | Bruce Gill |
| Canadian | 1,175,228 | October 2, 1984 | Everett G. Fancey et al |
| British | 656,372 | August 22, 1951 | David Minor Andrist |
| U.S.A. | 2,511,828 | June 20, 1950 | David Minor Andrist |
| U.S.A. | 2,518,590 | August 15, 1950 | David Minor Andrist |
| U.S.A. | 2,670,556 | March 2, 1954 | T. H. McC. Hopkins et al |
| U.S.A. | 4,437,254 | March 20, 1984 | Everett G. Fancey et al |

In most of the prior art listed above, bait is supplied to the baiter in discrete portions which are then placed onto hooks by moving the hooks either through a hopper full of the bait, or along a guide so that it picks up a piece of bait positioned by the side of the guide. The piece of bait is usually held by a movable wall or similar retention member so that when the hooks continues through the bait and the hook eventually push the wall out of the path of travel so that the baited hook can pass and the wall can then move back into the path of travel under the action of a spring so that it is in a position to stop the next piece of bait proceeding in front of the next hook.

In one of the above patents, namely U.S. Pat. No. 2,511,828 there is disclosed a baiting machine in which the bait is sliced from a whole fish and then placed onto a hook as the hook travels through a slotted tube. The bait is sliced by a curved blade which is operated by the line of hooks passing through the machine. Due to the construction of the machine, however, the bait is not securely situated upon all of the hooks as there is no rotation of the bait during baiting. None of the other prior art shows an efficient baiting machine.

There is therefore a requirement for an efficient and reliable apparatus for cutting bait and hooking it so that it is securely placed upon a hook.

The invention of this application concerns an automatic baiting apparatus which has a hopper through which can be fed whole fish, a knife blade below the hopper for slicing off individual pieces of bait, this knife blade being operable by a reciprocating drive such as an electrical solenoid, a linear motor, an hydraulic or pneumatic ram, or the like. As the knife is slicing the bait, it is also moving a ramp or cam plate which operates a cam follower driven lever mechanism so that the piece of bait which is cut is held by a retainer driven by the lever mechanism, against a stationary wall of the container. A hook passing through the container is then forced into the bait and the bait is pulled through the container and is forced by the retainer to rotate and be securely forced onto the hook. The baited hook then operates a switch on its way out of the compartment which activates the knife and hence the retainer to their inoperative positions permitting the fish or other bait material to drop in front of the knife. The cycle then automatically repeats.

The baiter will now be described with reference to the accompanying drawings in which.

Figure 1:
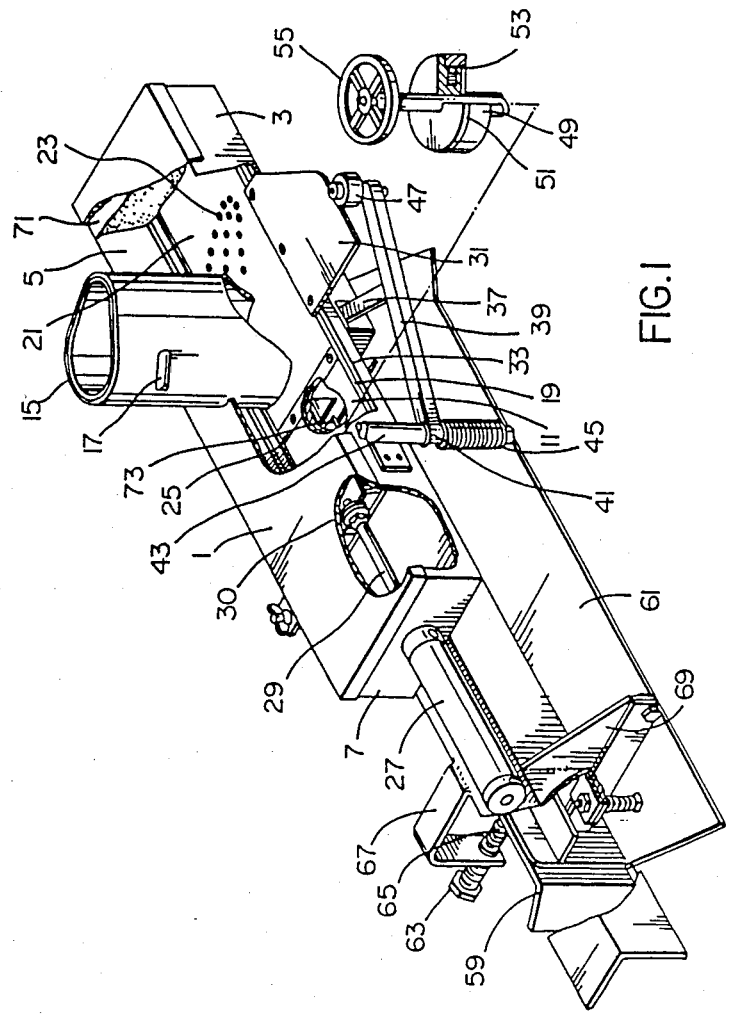
FIG. 1 is a partly sectioned perspective view of the baiter apparatus.

Referring to the drawings and specifically FIG. 1, the baiter apparatus consists of an elongated box 1 preferably made of metal and having elongated sides 3 and 5, a front end 7, a rear end 9 and a base 11. The top 5 is hinged or otherwise pivotally secured to the upper edge of side 3 and is held in place by set screws or the like (not shown). An enclosed chute 15 is secured to the top 1 of the box which has an aperture corresponding with the lower end of the chute to provide access into the box from the chute. A water feed pipe 17 is secured to the chute to provide a water spray within the chute. The chute preferably is of oval shaped cross section which will position fish bait to align it in a required orientation for baiting.

The lower side of the box is open for some of its length and is provided with a frame 19 which can reciprocally slide within the bottom of the box. This frame 19 holds a knife blade 21 which preferably has apertures 23 therethrough to permit water flow. A cutter blade 15 is secured by countersunk head bolts or the like across the front of the bottom 11 so that as the knife blade 21 moves towards the cutter blade 25, a piece of bait stock such as a fish which is protruding from chute 15 is severed.

Frame 19 which includes the knife blade 21 is reciprocally moved by a reciprocating actuator 27 which has a piston rod 29 which has its free end secured, preferably through a resilient coupling 30, to the rear end of frame 19. The reciprocating actuator 27 is itself secured to end 7 of the box by a threaded connection or some other convenient type of connection.

The actuator can be of any conventional type such as electrical solenoid, linear motor, hydraulic or pneumatic cylinder and piston arrangement, or can also be hand operated by a lever arrangement although this will lead to a much slower operating cycle. A cam plate 31 is secured, by bolts or the like to frame 19 and passes through a slot 33 in elongated side 3.

Below knife blade 23 there is situated a movable retainer or gripper 35 (FIG. 2) which is secured to arm 37 which itself is ridgedly secured to pivot arm 39. Pivot arm 39 has a cylindrical rod 41 at its pivoting end which passes through a bearing 43 which is secured to side 3 of the box. A coil spring 45 is secured to rod 41 and side 3 to bias the free end of lever 39 towards side 3. A cam follower, in the form of a roller 47, is secured to the free end of lever 39 to follow the cam plate 31. Rod 41 has, at its upper end an adjuster which has one part 49 secured to the upper end of bearing 43 and another part 51 cooperating therewith and secured to the rod. Between the two parts there is a gripping mechanism consisting of a spring loaded ball arrangement 53, and an actuating wheel 55 is secured to the top of the rod. The biasing force against lever 39 can therefore be adjusted by turning actuating wheel 55.

Figure 2:
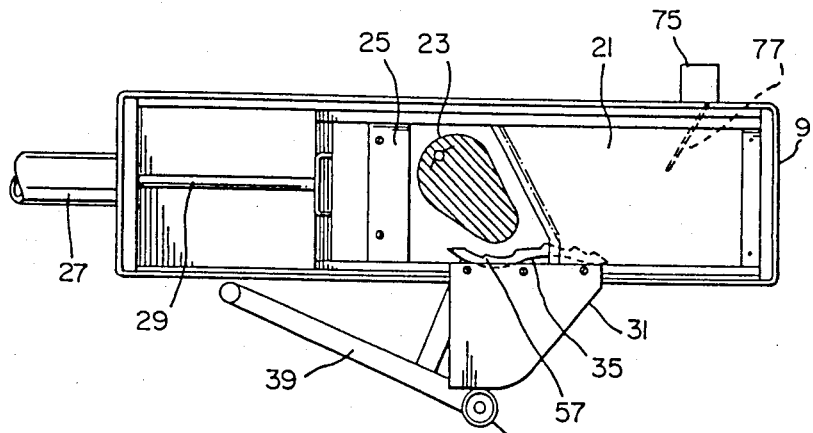
FIGS. 2 through 6 are diagrammatic views showing various stages in the operation of the baiter apparatus.

The gripper 35, as shown in FIG. 2, can be of any suitable shape but is preferably curved first concavely and then convexly and has teeth 57 to assist in gripping the bait. The gripper 35 is preferably in the form of a two pronged fork to permit a hook to pass through it between the prongs. The securement of the gripper to lever 39 is such that the gripper moves across the box with a motion in which the alignment of the gripper does not vary greatly across the width of the box. A slot is formed for the guiding of hooks to be baited, between plate 59 and plate 61, plate 61 being spring loaded towards plate 59 through an adjustable spring loading system consisting of bolt 63, spring 65 and bracket 67 which is welded or otherwise suitably attached to plate 61. A spring loaded bracket 69 is also utilized to vertically position plate 61. Hooks are guided between plates 59 and 61 and pass to the rear of box 1 to pick up cut bait. The hook guide (not shown) is a simple part spiral groove. Plastic lining 71 is preferably utilized on all inner sides of the box or at least at each end to provide cushioning for the movement of the frame and cutting knife. A water spray 73 can also be mounted below the box to keep the gripping mechanism free from debris.

In order to operate the reciprocating actuator automatically, a switch 75 as shown in FIG. 2 can be utilized, this switch having a lever 77 which extends into the path of the baited hooks.

The operation of the baiter will now be discussed with reference to FIGS. 2 through 6.

In FIG. 2 the knife blade 21 has just moved from left to right, the bait material 23 has just dropped from the hopper into the space between the front of the knife blade 21 and the cutter blade 25, and the actuator 27 has just been energized to move, as lever 77 of switch 75 has just swung from right to left after a previous baited hook has passed. Note that gripper 57 is at one side of the box having been moved to this position by lever 39 under the urging of cam plate 31 upon roller 47.

Figure 3:
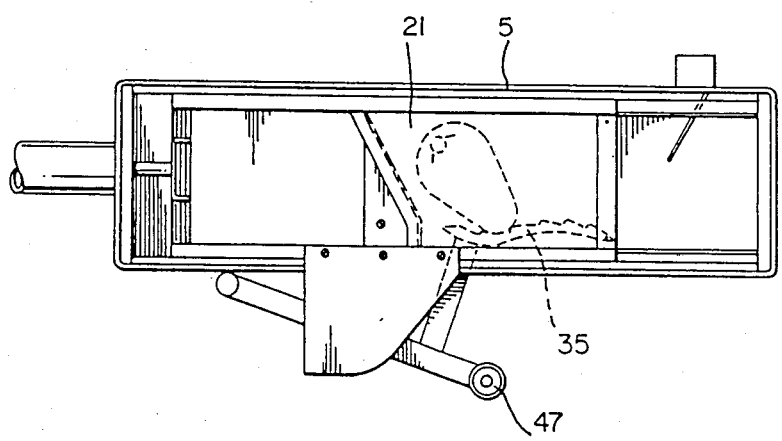

In FIG. 3 the actuator 27 has moved the knife blade 21 from right to left so slicing a piece of bait from the bait material. The cam plate 31 has also moved from right to left with the knife blade and the gripper 35 is now acting against the piece of bait and is now moving it towards an extension of side 5 of the box. Note that the cam follower 47 is not under the influence of cam plate 31 and the spring 45 is now controlling the gripper 35.

Figure 4:
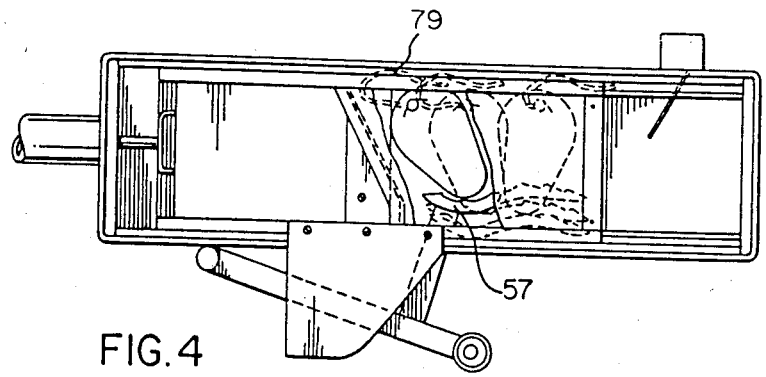

In FIG. 4 a hook 79 is moving into the bait and rotates the bait as shown, the rotation being assisted by teeth 57 on the gripper 35. By achieving a positive rotation of the bait, the barbed end of the hook is encouraged to pass through the bait and around the bone when fish are being used as bait.

Figure 5:
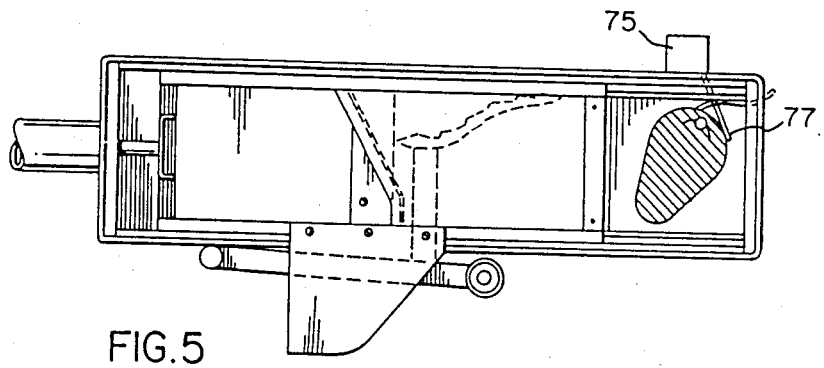

In FIG. 5 the baited hook has now been pulled from the end of the gripper 35, the gripper has therefore moved to its maximum movement under the action of coil spring 45 acting upon lever 39, and the baited hook has moved the arm 77 of switch 75 from left to right so beginning activation of the reciprocal actuator.

Figure 6:
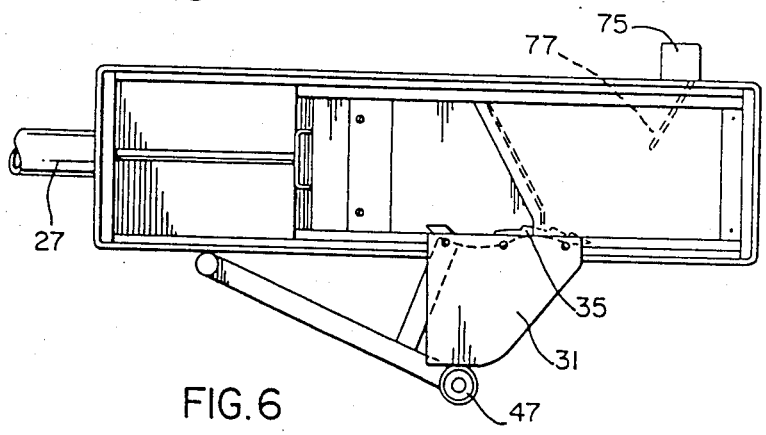

In FIG. 6 the reciprocal actuator has now moved so moving the knife blade from left to right and withdrawing the gripper under action of the cam plate 31 and cam follower 47. The switch arm 77 has again moved from right to left so that a signal from switch 75 has been passed to reciprocal actuator 27 to move the knife blade from right to left. If bait is in the hopper, it will drop between the knife blade and the cutter blade at this stage of operation as shown in FIG. 2 to repeat the cycle.

The electrical circuitry or electro-hydraulic or electro-pneumatic circuitry and piping has not been shown in the drawings as such systems are well known and can easily be designed by a competent person skilled in the art of electrical or electro-hydraulic or electro-pneumatic controls.

It should also be noted that during all of the operation, water can flow under control of a shut off value both through pipe 17 and through spray 73 so that there is good lubrication for the bait when being passed through the apparatus. Any debris can also be washed from the apparatus before it builds up to a quantity which could interfere with the operation.

It is submitted that the above discloses an automatic baiter which is a great improvement on any known baiters, some of the following advantages being achieved by this baiter:

1. Baiting is achieved through the skin of the dorsal region which encourages the barbed end of the hook to pass around the bone through the bait.

2. This baiter can accommodate all kinds of bait such as herring, squid, mackerel etc.

3. The baiter is a separate unit and trawling lines can be accepted through the baiter with or without floats as only the hook and snood pass through the baiter.

4. The baiter can admit the passage of two or more hooks at once without damaging the system as the hook guide is spring loaded.

5. The baiter is relatively small and can be fitted on small boats down to at least 18 feet in length.

6. The baiter is very efficient and simple and as it is off extremely small dimensions, is portable so that repairs can easily be undertaken if required.

7. Can be operated by different reciprocal actuators such as a solenoid, linear motor hydraulic or pneumatic piston and cylindrical arrangements, or mechanical spring loaded lever mechanisms.

8. The knife blade is fitted within a frame and can easily be changed in a very short time as it can be accessed easily and removed from the frame easily.

9. The baiter is automatically cleaned by spraying water through.

10. The baiter requires only one operator.

The protection will now be defined by the following claims.

The embodiments of the invention in which an exclusive property or privilege is claimed are defined as follows:

1. A baiting apparatus having a chute for feeding bait stock, a reciprocally moveable knife blade below the chute for slicing pieces of bait from the stock, a cam plate secured to operate with the knife blade, a cam follower in operative association with the cam plate, a lever mechanism operable by the cam follower, and a retainer secured to the lever mechanism for retaining and gripping the sliced piece of bait.

2. The apparatus of claim 1, including a reciprocating driver for the knife blade.

3. The apparatus of claim 2, wherein the driver is an electrically operated solenoid.

4. The apparatus of claim 2, wherein the driver is a linear motor.

5. The apparatus of claim 2, wherein the driver is an hydraulically operated cylinder and piston assembly.

6. The apparatus of claim 2, wherein the driver is a pneumatically operated cylinder and piston assembly.

7. The apparatus of claim 2, wherein the driver is a pivoted lever and rod mechanism.

8. The apparatus of claim 1, wherein the knife blade has aperatures therethrough to permit passage of water.

9. The apparatus of claim 1, wherein the knife blade has an angled front cutting edge.

10. The apparatus of claim 1, including a reciprocable frame secured to the knife blade.

11. The apparatus of claim 10, wherein the cam plate is secured to the frame.

12. The apparatus of claim 2, including a reciprocable frame secured between the knife blade and the reciprocating driver.

13. The apparatus of claim 1, wherein the cam follower is a roller.

14. The apparatus of claim 1, including a cutter blade in a stationary position in front of the knife blade.

15. The apparatus of claim 1, wherein the retainer is in the shape of a two pronged fork.

16. The apparatus of claim 15, wherein the retainer has teeth along the side facing the bait.

17. The apparatus of claim 1, wherein the lever mechanism is spring biased so that the cam follower is biased towards the cam plate.

18. The apparatus of claim 1, including a guide for hooks upon a line, the guide having sides which are spring biased towards each other and leading a line of hooks into the region below the knife blade to spear a piece of bait.

19. The apparatus of claim 18, including a switch positioned at the outlet end and a switch operating arm extending into the path of travel of a hook such that passage of a hook can actuate the switch.

20. The apparatus of claim 19, wherein the switch initiates operation of a reciprocating driver for the knife blade.

21. The apparatus of claim 1 including a box enclosing the knife blade and for retaining the pieces of bait, the chute being secured to the top of the base which is removeably held in place for easy access to the knife blade.

22. The apparatus of claim 1, including a water pipe secured to the wall of the chute to provide a flow of water inside the chute and around the knife blade.

23. The apparatus of claim 1, wherein the chute is of oval cross section.

* * * * *